Figures 1, 2, 3, 4:
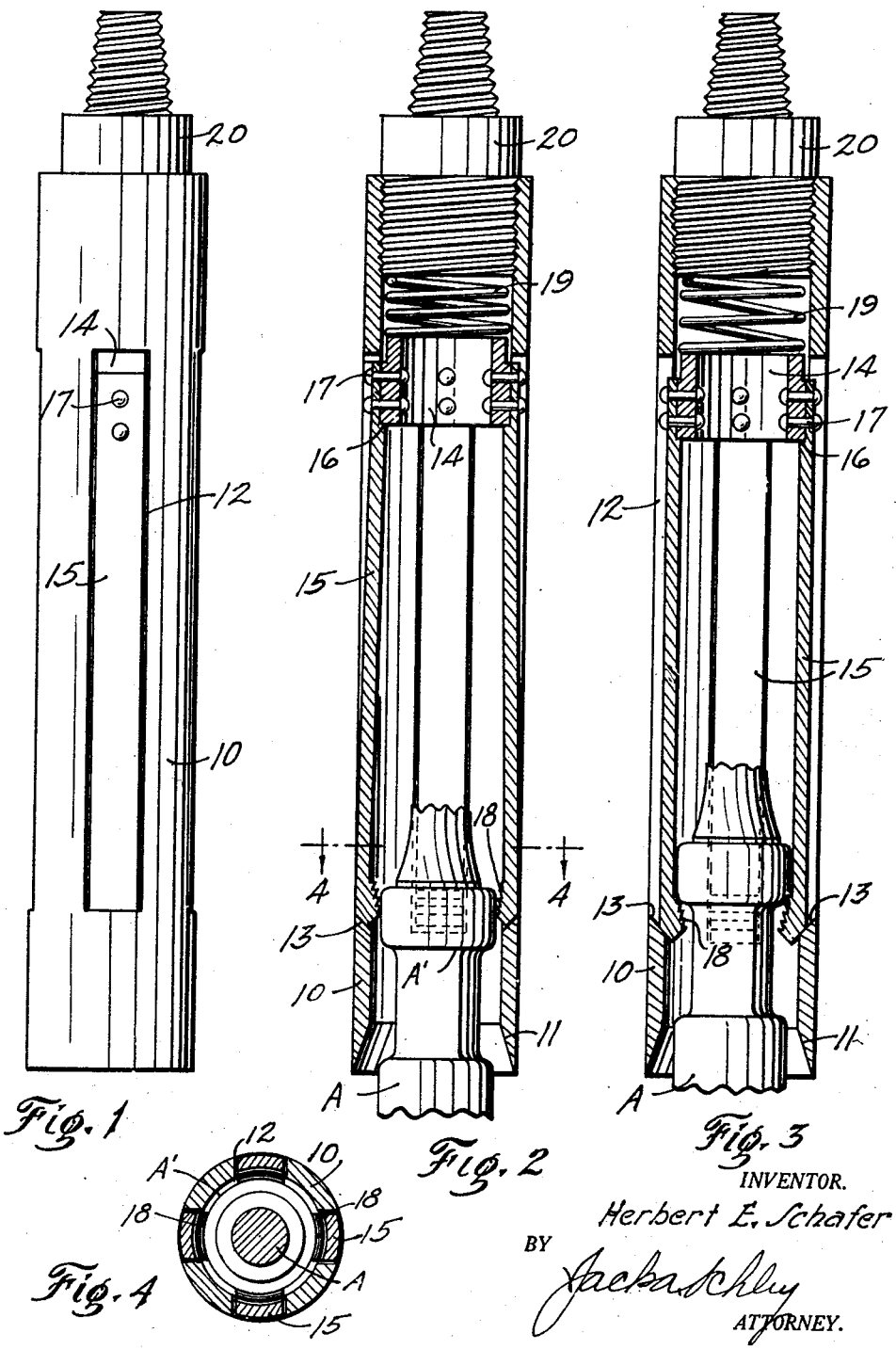

April 21, 1931.  H. E. SCHAFER  1,801,984
FISHING TOOL
Filed Sept. 26, 1929

INVENTOR.
Herbert E. Schafer
BY
Jack Achley
ATTORNEY.

Patented Apr. 21, 1931

1,801,984

UNITED STATES PATENT OFFICE

HERBERT E. SCHAFER, OF SEMINOLE, OKLAHOMA

FISHING TOOL

Application filed September 26, 1929. Serial No. 395,223.

This invention relates to new and useful improvements in fishing tools and has for an object to provide a fishing tool for insertion in well tubing for the recovery of objects therefrom, such as sucker rods and the like which have been dropped therein.

An important object of the invention is to provide a fishing tool for engaging over the collars of sucker rods and the like and capable of passing between said collars and the surrounding tubing.

Another object of the invention is to provide a fishing tool having slips with teeth inclined downwardly towards the center for engaging underneath the collars of the sucker rods being fished for.

A still further object of the invention is to provide a fishing tool of simple construction that is strong and durable and embodying positive gripping means, thereby assuring the efficient and quick removal of said sucker rods from the tubing.

A construction designed to carry out the invention will be hereinafter described, together with other features of the invention.

The invention will be more readily understood from a reading of the following specification and by reference to the accompanying drawings in which an example of the invention is shown, and wherein:

Figure 1 is an elevation of a fishing tool constructed in accordance with the invention, Figure 2 is a vertical sectional view of the same showing the slips receded for the passage therethrough of a sucker rod collar, Figure 3 is a vertical sectional view showing a sucker rod collar engaged and gripped by the fishing tool, and Figure 4 is a cross-sectional view taken on the line 4—4 of Figure 2.

In the drawings the numeral 10 designates a barrel having its lower end bevelled at 11 for guiding the sucker rods being fished for within the tool. As this tool is particularly designed for engaging over the collars of sucker rod joints and the like, the barrel is made with thin walls so that the tool will slip down between said collars and the surrounding tubing. The barrel is provided with a plurality of longitudinal slots 12 which have their lower ends 13 inclined downwardly and inwardly.

Within the barrel is a collar 14 to which is secured a plurality of spring arms 15, each positioned in one of the slots 12. The arms 15 are provided with shoulders 16 upon which the collar 14 seats, thus preventing the shearing of the rivets 17 by which the arms are secured to the collar. By simply beheading the rivets the arms may be replaced when necessary with new arms and new rivets.

Each arm has a toothed slip 18 at its lower end and is bevelled so as to ride on the inclines 13. One of the important features of the invention is that the teeth are inclined downwardly toward the center of the barrel, thereby allowing the slips to engage the under side of a collar A' of a sucker rod A being fished for, as shown in Figure 3. The arms 15 are forced downwardly by a compressed spring 19 which is confined in the barrel 10 by the collar 14 and a plug 20 threaded in the top of the barrel.

In using the fishing tool the sucker rod A is guided in said tool by the bevelled face 11. When the collar A' of the sucker rod engages the slips 18, said slips will recede within the slots 12, as is shown in Figure 2, until the collar has passed. The slips are then forced downwardly and inwardly on the inclines 13 by the compressed spring 19, thus bringing the teeth of the slips under the collar A' of the sucker rod and as the tool is raised the teeth being inclined downwardly toward the center of the barrel, will take hold underneath the collar in such a manner that the greater the resistance of the sucker rod to the upward pull of the tool the tighter the slips will grip the collar. Such action is due to the seating of the slips on the inclines 13 so that a downward pull on the slips will force them inwardly towards the center, thereby assuring a positive hold upon the sucker rod being fished for.

Various changes in the size and shape of the different parts, as well as modifications and alterations, may be made within the scope of the appended claim.

What I claim, is:

In a fishing tool, an elongated barrel having longitudinal slots therein, a slidable collar within said barrel, spring arms in the slots, the spring arms having shoulders at their upper ends fitting tightly beneath the lower edge of said collar and means tightly securing the upper ends of said arms to said collar, slips formed on the lower ends of said spring arms and having toothed faces inclined downwardly toward the center of the barrel and the cross sectional diameter of the slips increasing from a plane near the upper edges thereof to a plane near the lower edges thereof, the slots being provided with shoulders at the bottom and the slips provided with inclined backs to ride on said shoulders, the said slips also provided with oppositely inclined lower front faces adapted to ride over the article fished for, a plug in the upper end of the barrel, and a coil spring confined in the barrel between the plug and the said collar for forcing the latter downwardly.

In testimony whereof I affix my signature.

HERBERT E. SCHAFER.